(No Model.)

C. NORDENHOLT.
FISHING REEL.

No. 425,243. Patented Apr. 8, 1890.

WITNESSES:
William Miller
Edward Wolff

INVENTOR
Claus Nordenholt.
BY
Van Santvoord & Hauff
ATTORNEYS

United States Patent Office.

CLAUS NORDENHOLT, OF BROOKLYN, NEW YORK.

FISHING-REEL.

SPECIFICATION forming part of Letters Patent No. 425,243, dated April 8, 1890.

Application filed January 2, 1890. Serial No. 335,676. (No model.)

*To all whom it may concern:*

Be it known that I, CLAUS NORDENHOLT, a citizen of the United States, residing at Brooklyn, in the county of Kings and State of New York, have invented new and useful Improvements in Fishing-Reels, of which the following is a specification.

This invention relates to an improvement in fishing-reels, and a fishing-reel made according to this invention is narrow and possesses little bulk, so that said reel can be readily packed or stored away.

This invention is set forth in the following specification and claims, and illustrated in the accompanying drawings, in which—

Figure 1:
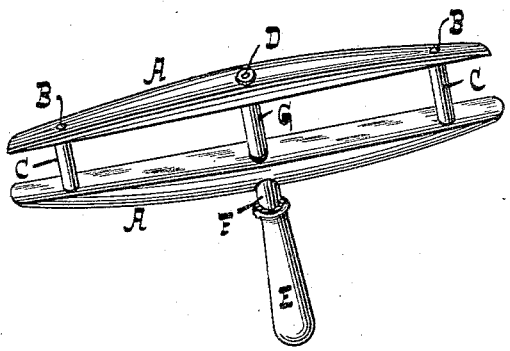
Figure 2:
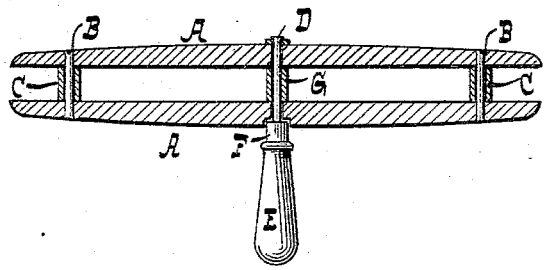

Figure 1 is a perspective view of a fishing-reel. Fig. 2 is a side elevation, partly in section, of Fig. 1.

The reel is constructed of two arms A A, which are readily made from strips of wood. The arms A are joined by pins or rivets B, surrounded by sleeves C. The sleeves C hold the arms A a suitable distance apart, and the fish-line being wound about said sleeves C said sleeves prevent the line coming in contact with the rivets B, thus protecting the rivets.

It is obvious that the pins or rivets B may be placed at any desired distance from the middle of the arms A A, according to the circumstances.

The arms A can rotate about the pivot D, supported by the handle E. Said handle has a shoulder or offset F, entering a recess in one of the arms A, so that said arms are steadied in their rotation. A sleeve G surrounds and protects the pivot D. The arms A being long and narrow, the reel has a flat shape, so that it can be conveniently carried in a flat pocket or bag or stored away in a narrow space.

What I claim as new, and desire to secure by Letters Patent, is—

1. A fishing-reel consisting of the rotary arms A, in combination with the central pivot D, having the surrounding sleeve G and supported by the handle E, said rotary arms A connected by rivets or pins B, surrounded by sleeves C, situated distant from the central pivot D, substantially as described.

2. A fishing-reel consisting of the rotary arms A, in combination with the pivot D, having the surrounding sleeve G and supported by the handle E, said arms A connected by rivets or pins B, surrounded by sleeves C, situated distant from the central pivot D, and said handle having a shoulder or offset F, entering a suitable recess in one of the arms A, so that said arms are steadied during rotation, substantially as described.

In testimony whereof I have hereunto set my hand in the presence of two subscribing witnesses.

CLAUS NORDENHOLT.

Witnesses:
J. VAN SANTVOORD,
E. F. KASTENHUBER.